United States Patent
Shi

(10) Patent No.: US 11,765,743 B2
(45) Date of Patent: *Sep. 19, 2023

(54) DOWNLINK CHANNEL RECEIVING METHOD AND TERMINAL DEVICE

(71) Applicant: GUANGDONG OPPO MOBILE TELECOMMUNICATIONS CORP., LTD., Guangdong (CN)

(72) Inventor: Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,006

(22) Filed: Feb. 8, 2022

(65) Prior Publication Data

US 2022/0167327 A1    May 26, 2022

Related U.S. Application Data

(63) Continuation of application No. 16/725,258, filed on Dec. 23, 2019, now Pat. No. 11,310,787, which is a
(Continued)

(51) Int. Cl.
*H04W 74/08* (2009.01)
*H04W 72/23* (2023.01)

(52) U.S. Cl.
CPC ....... *H04W 72/23* (2023.01); *H04W 74/0833* (2013.01)

(58) Field of Classification Search
CPC . H04W 68/02; H04W 72/23; H04W 74/0833; H04L 5/0064; H04L 5/0044; H04L 1/1887; H04L 5/0053
See application file for complete search history.

(56) References Cited

U.S. PATENT DOCUMENTS

2013/0242770 A1* 9/2013 Chen .............. H04W 52/02
370/252
2015/0016312 A1    1/2015 Li et al.
(Continued)

FOREIGN PATENT DOCUMENTS

CN        104186017 A    12/2014
CN        106162874 A    11/2016
(Continued)

OTHER PUBLICATIONS

International Preliminary Report on Patentability (IPRP) dated Nov. 17, 2020 for Application No. PCT/CN2018/086564.
(Continued)

*Primary Examiner* — Chi Ho A Lee
(74) *Attorney, Agent, or Firm* — Ladas & Parry LLP

(57) ABSTRACT

The present application discloses a downlink channel receiving method and a terminal device, including: receiving, by a terminal device, first downlink authorization information and second downlink authorization information that are sent by a network device, where the first downlink authorization information is used to indicate that the terminal device receives a first physical downlink shared channel PDSCH in a first time unit, the second downlink authorization information is used to indicate that the terminal device receives a second PDSCH in a second time unit, and at least one symbol of the first time unit and at least one symbol of the second time unit overlap in a time domain; determining, by the terminal device, according to a RNTI used to scramble the first downlink authorization information and the second downlink authorization information, a PDSCH that is preferentially decoded from the first PDSCH and the second PDSCH.

2 Claims, 2 Drawing Sheets

Related U.S. Application Data continuation of application No. PCT/CN2018/086564, filed on May 11, 2018.

(56) References Cited

U.S. PATENT DOCUMENTS

| | | | |
|---|---|---|---|
| 2016/0066345 A1 | 3/2016 | Sun et al. | |
| 2016/0146922 A1 | 5/2016 | Moshfeghi | |
| 2016/0234853 A1* | 8/2016 | Yang | H04B 1/7097 |
| 2016/0338111 A1 | 11/2016 | Han et al. | |
| 2017/0086220 A1* | 3/2017 | Kim | H04W 72/23 |
| 2017/0289869 A1 | 10/2017 | Nogami et al. | |
| 2018/0317198 A1 | 11/2018 | Lee et al. | |
| 2018/0338307 A1 | 11/2018 | Feng | |
| 2019/0045488 A1 | 2/2019 | Park et al. | |
| 2019/0104435 A1 | 4/2019 | Cho et al. | |
| 2019/0239245 A1 | 8/2019 | Davydov et al. | |
| 2019/0254009 A1* | 8/2019 | Hwang | H04W 72/12 |
| 2019/0261431 A1 | 8/2019 | Tsai et al. | |
| 2019/0306848 A1 | 10/2019 | Zhou et al. | |
| 2019/0349902 A1* | 11/2019 | Soriaga | H04W 72/23 |
| 2020/0008231 A1* | 1/2020 | Vilaipornsawai | H04B 7/024 |
| 2020/0288441 A1* | 9/2020 | Park | H04L 5/0091 |
| 2020/0396759 A1 | 12/2020 | Baldemair et al. | |

FOREIGN PATENT DOCUMENTS

| | | |
|---|---|---|
| CN | 106211086 A | 12/2016 |
| CN | 107517433 A | 12/2017 |
| CN | 107852313 A | 3/2018 |
| CN | 107920334 A | 4/2018 |
| RU | 2631671 C2 | 9/2017 |
| WO | 2017135696 A1 | 8/2017 |
| WO | 2017156788 A1 | 9/2017 |

OTHER PUBLICATIONS

Qualcomm Incorporated Summary of DLUL scheduling and HARQ management, R1-1803470 3GPP TSG-RAN WG1 Meeting AH 1801 Mar. 2, 2018.
Qualcomm Incorporated Discussion on Simultaneous PDSCH Reception, R1-1803533 3GPP TSG-RAN WG1 Meeting AH 1801 Mar. 2, 2018.
The first Office Action of corresponding Chinese application No. 201880003148.7, dated Jan. 17, 2020.
The second Office Action of corresponding Chinese application No. 201880003148.7, dated Mar. 23, 2020.
Qualcomm Incorporated, h3GPP TSG-RAN WG1 Meeting #92bis, R1-1805746; Summary of DLUL Scheduling and HARQ management, Apr. 16-20, 2018, Sanya, China.
The Decision of Rejection of corresponding Chinese application No. 201880003148.7, dated Jun. 12, 2020.
The EESR of corresponding European application No. 18917634.0, dated Jul. 1, 2020.
Huawei et al:"Remaining issues on scheduling and HARQ", 3GPP Draft; 5G44 HARQ1 R1-1804431 HARQ1 Remaining Issues on Scheduling and HARQ_Final_Clean, 3rd Generation Partnership Project (3GPP), Mobile Competence Centre; 650, Route Des Lucioles; F-06921 SOP vol. RAN WG1, No. Sanya, China; Apr. 16, 2018-Apr. 20, 2018 Apr. 15, 2018(Apr. 15, 2018), XP051425859.
The third Office Action of corresponding Chinese application No. 201880003148.7, dated Nov. 11, 2020.
The first Office Action of corresponding European application No. 18917634.0, dated Jan. 28, 2021.
The second Office Action of corresponding European application No. 18917634.0, dated Jul. 13, 2021.
The first Office Action of corresponding Russian application No. 2020137911, dated Aug. 30, 2021.
The third Office Action of corresponding European application No. 18917634.0, dated Oct. 14, 2021.
The first Office Action of corresponding Canadian application No. 3099867, dated Nov. 29, 2021.
The first Office Action of corresponding Indian application No. 202017047923, dated Dec. 8, 2021.
International Search Report (ISR) with an English translation dated Jan. 31, 2019 for Application No. PCT/CN2018/086564.
Non-Final Rejection dated Jun. 3, 2021 for U.S. Appl. No. 16/725,258.
The first Office Action of corresponding Japanese application No. 2021-512978, dated Mar. 1, 2022.
Ericsson, Remaining details of low cost MTC UE[online], 3GPP TSG-RAN WG1#75 R1-135643, URL:http://www.3gpp.org/ftp/tsg_ran/WG1_RL1/TSGR1_75/Docs/R1-135643.zip>.
Huawei, HiSilicon, Further considerations on non-simul aneous reception and transmission for MTC Ues[online], 3GPP TSG-RAN WG1#83 R1-156450, <URL:http://www.3gpp.org/ftp/tsg_ran/WG1_RL1/TSGR1_83/DocsR1-156450.zip>.
The First Office Action of corresponding Singapore application No. 11202011108Q, dated Aug. 17, 2022.

* cited by examiner

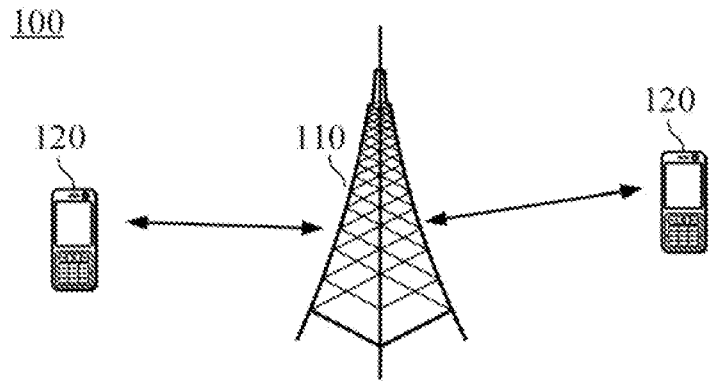

FIG. 1

A terminal device receives first downlink authorization information and second downlink authorization information that are sent by a network device, where the first downlink authorization information is used to indicate that the terminal device receives a first physical downlink shared channel PDSCH in a first time unit, the second downlink authorization information is used to indicate that the terminal device receives a second PDSCH in a second time unit, and at least one symbol of the first time unit and at least one symbol of the second time unit overlap in a time domain ⟵ 210

The terminal device determines, according to a RNTI used to scramble the first downlink authorization information and the second downlink authorization information, a PDSCH that is preferentially decoded from the first PDSCH and the second PDSCH ⟵ 220

FIG. 2

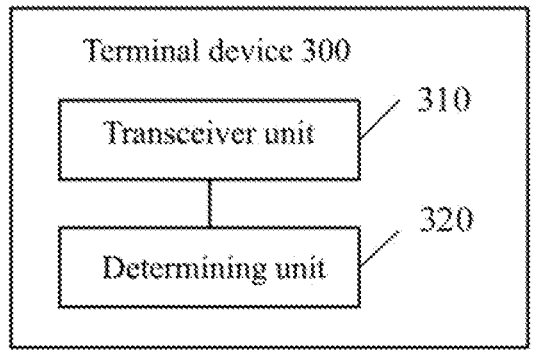

FIG. 3

DOWNLINK CHANNEL RECEIVING METHOD AND TERMINAL DEVICE

CROSS-REFERENCE TO RELATED APPLICATION

This application is a continuation application of U.S. patent application Ser. No. 16/725,258, filed on Dec. 23, 2019, which is a continuation of International Application No. PCT/CN2018/086564, filed on May 11, 2018. The disclosures of the above applications are hereby incorporated by reference in their entireties.

TECHNICAL FIELD

Embodiments of the present application relate to the field of communications and, more particularly, to a downlink channel receiving method and a terminal device.

BACKGROUND

A network device sends a downlink control channel scrambled with a radio network temporary identifier (RNTI) to a terminal device, and the terminal device receives, based on indication information in the downlink control channel scrambled with the RNTI, a downlink data channel, so that different RNTIs may correspond to different downlink data channels. There is a plurality of RNTIs in a communication system, such as a paging RNTI (P-RNTI), a system information RNTI (SI-RNTI), a random access RNTI (RA-RNTI), and a temporary cell RNTI (TC-RNTI). How the terminal device decodes the downlink data channels corresponding to the different RNTIs when at least one symbol of transmission time units of the downlink data channels corresponding to the different RNTI scrambling codes overlaps becomes a problem to be solved.

SUMMARY

Embodiments of the present application provide a downlink channel receiving method and a terminal device, and the terminal device may effectively decode downlink data channels corresponding to downlink control channels scrambled with different RNTIs when at least one symbol of transmission time units of the downlink data channels overlaps, so as to improve a reception performance of the downlink data channels.

A first aspect provides a downlink channel receiving method including: receiving, by a terminal device, first downlink authorization information and second downlink authorization information that are sent by a network device, where the first downlink authorization information is used to indicate that the terminal device receives a first physical downlink shared channel PDSCH in a first time unit, the second downlink authorization information is used to indicate that the terminal device receives a second PDSCH in a second time unit, and at least one symbol of the first time unit and at least one symbol of the second time unit overlap in a time domain; and determining, by the terminal device, according to a radio network temporary identifier RNTI used to scramble the first downlink authorization information and the second downlink authorization information, a PDSCH that is preferentially decoded from the first PDSCH and the second PDSCH.

Therefore, when at least one symbol of transmission time units of downlink data channels corresponding to downlink control channels scrambled with different RNTIs overlaps in a time domain, the terminal device determines the downlink data channel to be preferentially decoded according to the RNTIs used to scramble the downlink control channels, so that it may effectively decode the downlink data channels, thereby improving the reception performance of the downlink data channels.

With reference to the first aspect, in a possible implementation form of the first aspect, the first downlink authorization information is downlink authorization information scrambled with an SI-RNTI, and the second downlink authorization information is downlink authorization information scrambled with a P-RNTI. The determining, by the terminal device, a PDSCH that is preferentially decoded from the first PDSCH and the second PDSCH, includes: determining, by the terminal device, to preferentially decode the first PDSCH corresponding to the SI-RNTI in case that the terminal device determines that system information is changed; and determining, by the terminal device, to preferentially decode the second PDSCH corresponding to the P-RNTI in case that the terminal device determines that the system information is unchanged.

With reference to the first aspect or any one of the foregoing possible implementation forms, in another possible implementation form of the first aspect, the determining, by the terminal device, a PDSCH that is preferentially decoded from the first PDSCH and the second PDSCH, includes: determining, by the terminal device, to preferentially decode the second PDSCH corresponding to the P-RNTI.

With reference to the first aspect or any one of the foregoing possible implementation forms, in another possible implementation form of the first aspect, the first downlink authorization information is downlink authorization information scrambled with an SI-RNTI, and the second downlink authorization information is downlink authorization information scrambled with an RA-RNTI or a TC-RNTI. The determining, by the terminal device, a PDSCH that is preferentially decoded from the first PDSCH and the second PDSCH, includes: determining, by the terminal device, to preferentially decode the first PDSCH corresponding to the SI-RNTI in case that the terminal device determines that system information is changed; and determining, by the terminal device, to preferentially decode the second PDSCH corresponding to the RA-RNTI or the second PDSCH corresponding to the TC-RNTI in case that the terminal device determines that the system information is unchanged.

With reference to the first aspect or any one of the foregoing possible implementation forms, in another possible implementation form of the first aspect, the determining, by the terminal device, a PDSCH that is preferentially decoded from the first PDSCH and the second PDSCH, includes: determining, by the terminal device, to preferentially decode the second PDSCH corresponding to the RA-RNTI or the second PDSCH corresponding to the TC-RNTI.

With reference to the first aspect or any one of the foregoing possible implementation forms, in another possible implementation form of the first aspect, the method further includes: receiving, by the terminal device, third downlink authorization information that is sent by the network device, where the third downlink authorization information is the downlink authorization information scrambled with the P-RNTI; and determining, by the terminal device, that the system information is changed according to the third downlink authorization information.

With reference to the first aspect or any one of the foregoing possible implementation forms, in another possible implementation form of the first aspect, the first downlink authorization information is downlink authorization information scrambled with a P-RNTI, and the second downlink authorization information is downlink authorization information scrambled with an RA-RNTI or a TC-RNTI. The determining, by the terminal device, a PDSCH that is preferentially decoded from the first PDSCH and the second PDSCH, includes: determining, by the terminal device, to preferentially decode the second PDSCH corresponding to the RA-RNTI or the second PDSCH corresponding to the TC-RNTI.

With reference to the first aspect or any one of the foregoing possible implementation forms, in another possible implementation form of the first aspect, the first downlink authorization information is downlink authorization information scrambled with a P-RNTI, and the second downlink authorization information is downlink authorization information scrambled with an RA-RNTI or a TC-RNTI. The determining, by the terminal device, a PDSCH that is preferentially decoded from the first PDSCH and the second PDSCH, includes: receiving, by the terminal device, the first PDSCH corresponding to the P-RNTI in the first time unit according to the first downlink authorization information.

With reference to the first aspect or any one of the foregoing possible implementation forms, in another possible implementation form of the first aspect, the first downlink authorization information is downlink authorization information scrambled with a P-RNTI, and the second downlink authorization information is downlink authorization information scrambled with an RA-RNTI or a TC-RNTI. The determining, by the terminal device, a PDSCH that is preferentially decoded from the first PDSCH and the second PDSCH, includes: determining, by the terminal device, to preferentially decode the second PDSCH corresponding to the RA-RNTI in case that the second downlink authorization information is the downlink authorization information scrambled with the RA-RNTI; and determining, by the terminal device, to preferentially decode the first PDSCH corresponding to the P-RNTI in case that the second downlink authorization information is the downlink authorization information scrambled with the TC-RNTI.

With reference to the first aspect or any one of the foregoing possible implementation forms, in another possible implementation form of the first aspect, a first symbol in the first time unit is earlier than a first symbol in the second time unit in the time domain. The determining, by the terminal device, a PDSCH that is preferentially decoded from the first PDSCH and the second PDSCH, includes: determining, by the terminal device, to preferentially decode the first PDSCH.

With reference to the first aspect or any one of the foregoing possible implementation forms, in another possible implementation form of the first aspect, a first symbol in the first time unit is earlier than a first symbol in the second time unit in the time domain. The determining, by the terminal device, a PDSCH that is preferentially decoded from the first PDSCH and the second PDSCH, includes: determining, by the terminal device, to preferentially decode the second PDSCH.

With reference to the first aspect or any one of the foregoing possible implementation forms, in another possible implementation form of the first aspect, the determining, by the terminal device, a PDSCH that is preferentially decoded from the first PDSCH and the second PDSCH, includes: determining, by the terminal device itself, to preferentially decode a PDSCH from the first PDSCH and the second PDSCH.

With reference to the first aspect or any one of the foregoing possible implementation forms, in another possible implementation form of the first aspect, the terminal device is a terminal device in an idle state.

A second aspect provides a terminal device that may perform the method according to the first aspect or any optional implementation form of the first aspect as such. The terminal device may include a functional module for performing the method according to the first aspect or any possible implementation form of the first aspect as such.

A third aspect provides a terminal device, including a processor and a memory. The memory is configured to store a computer program, and the process is configured to call and run the computer program stored in the memory, so as to perform the method according to the first aspect or any possible implementation form of the first aspect as such.

A fourth aspect provides a chip for implementing the method according to the first aspect or any possible implementation form of the first aspect as such.

The chip includes a processor configured to call and run a computer program from a memory, such that a device on which the chip is mounted performs the method according to the first aspect or any possible implementation form of the first aspect as such.

A fifth aspect provides a computer readable storage medium configured to store a computer program that causes a computer to perform the method according to the first aspect or any possible implementation form of the first aspect as such.

A sixth aspect provides a computer program product including computer program instructions that cause a computer to perform the method according to the first aspect or any possible implementation form of the first aspect as such.

A seventh aspect provides a computer program that when executed on a computer, causes the computer to perform the method according to the first aspect or any possible implementation form of the first aspect as such.

BRIEF DESCRIPTION OF THE DRAWINGS

FIG. 1 is a schematic diagram of a possible wireless communication system applied by an embodiment of the present application;

FIG. 2 is a schematic flowchart of a downlink channel receiving method according to an embodiment of the present application;

FIG. 3 is a schematic block diagram of a terminal device according to an embodiment of the present application;

DESCRIPTION OF EMBODIMENTS

Figure 4:
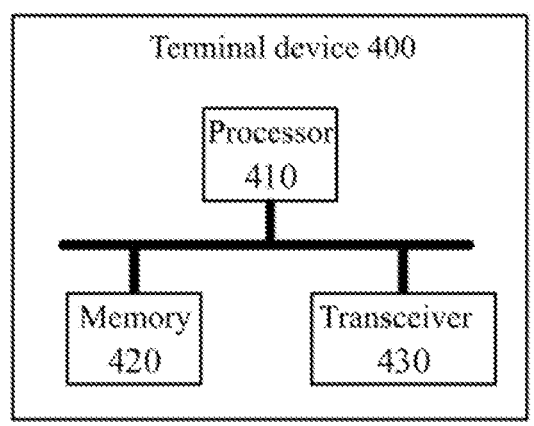
FIG. 4 is a schematic structural diagram of a terminal device according to an embodiment of the present application.

Technical solutions of embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD)

system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), a Wireless Fidelity (Wi-Fi), a next-generation communication systems, or other communication systems.

In general, the number of connections supported by a traditional communication system is limited, and it is also easy to implement. However, with a development of communication technologies, the mobile communication system will not only support traditional communication, but also support, for example, Device to Device (D2D) communication, Machine to Machine (M2M) communication, Machine Type Communication (MTC), and Vehicle to Vehicle (V2V) communication, or the like, and embodiments of the present application may also be applied to these communication systems.

In an embodiment, a communication system in the embodiments of the present application may be applied to a Carrier Aggregation (CA) scenario, or may be applied to a Dual Connectivity (DC) scenario, and may also be applied to a Standalone (SA) network construction scenario.

An applied spectrum will not be limited in the embodiments of the present application. For example, the embodiments of the present application may be applied to a licensed spectrum, and may also be applied to an unlicensed spectrum.

FIG. 1 illustrates a possible wireless communication system 100 applied by an embodiment of the present application. The wireless communication system 100 may include a network device 110. The Network device 110 may be a device communicating with a terminal device. The network device 110 may provide communication coverage for a particular geographic area and may communicate with a terminal device located within the coverage area. In an embodiment, the network device 100 may be a Base Transceiver Station (BTS) in a GSM system or a CDMA system, or may be a NodeB (NB) in a WCDMA system, or may be an Evolutional Node B (eNB or eNodeB) in an LTE system, or a network side device in the NR system, or a wireless controller in a Cloud Radio Access Network (CRAN), or the network device may be a relay station, an access point, a vehicle-mounted device, a wearable device, a network-side device in a next-generation network, or a network device in a future evolved Public Land Mobile Network (PLMN).

The wireless communication system 100 also includes at least one terminal device 120 located within the coverage of the network device 110. The terminal device 120 may be mobile or fixed. In an embodiment, the terminal device 120 may refer to an access terminal, a user equipment (UE), a subscriber unit, a subscriber station, a mobile station, a mobile table, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, a vehicle-mounted device, a wearable device, a terminal devices in the future 5G network, or a terminal device in the future evolved PLMN, or the like. In an embodiment, Device to Device D2D communication may be implemented among terminal devices 120.

The network device 110 may provide a service for a cell, and the terminal device 120 communicates with the network device 110 by using a transmission resource (for example, a frequency domain resource, or a spectrum resource) used by the cell, the cell may be a cell corresponding to the network device 110 (for example, a base station), the cell may belong to a macro base station, or may belong to a base station corresponding to a small cell, and the small cell may include: a metro cell, a micro cell, a pico cell, or a femto cell, or the like. These small cells have features of small coverage and low transmission power, which are suitable for providing a high-speed data transmission service.

FIG. 1 illustratively shows one network device and two terminal devices. In an embodiment, the wireless communication system 100 may include a plurality of network devices, and other numbers of terminal devices may be included within the coverage of each network device, which is not limited in the embodiments of the present application.

In an embodiment, the wireless communication system 100 may further include other network entities, such as a network controller and a mobility management entity, which is not limited in the embodiments of the present application.

In an embodiment, a downlink physical channel in the embodiments of the present application may include a Physical Downlink Control Channel (PDCCH), an Enhanced Physical Downlink Control Channel (EPDCCH), a Physical Downlink Shared Channel (PDSCH), a Physical Hybrid ARQ Indicator Channel (PHICH), a Physical Multicast Channel (PMCH), a Physical Broadcast Channel (PBCH), or the like.

It should be understood that the embodiments of the present application may include a physical channel or a reference signal with the same name but different functions as the above mentioned physical channel or reference signal, and may also include a physical channel or a reference signal with the same function but different names as the above mentioned physical channel or reference signal, which is not limited in the present application.

When the network device sends downlink data to the terminal device, it may send the PDCCH and the PDSCH scheduled by the PDCCH to the terminal device. Correspondingly, the terminal device needs to detect the PDCCH blindly and receive the PDSCH according to indication information in the PDCCH after receiving the PDCCH. Transmission of the PDCCH needs to use RNTI scrambling codes, and different downlink data correspond to different RNTIs.

When the terminal device is in a radio resource control-idle (RRC-idle) state, the terminal device needs to receive system information sent by the network device on a system information (SI) transmission period configured by the network device, where the terminal device may determine a resource occupied by a PDSCH corresponding to an SI-RNTI by receiving a PDCCH scrambled with the SI-RNTI, thereby receiving the PDSCH corresponding to the SI-RNTI.

The terminal device also needs to receive paging information sent by the network device on a paging period configured by the network device. The terminal device determines a resource occupied by a PDSCH corresponding to a P-RNTI by receiving a PDCCH scrambled with the P-RNTI, thereby receiving the P-RNTI PDSCH.

The terminal device may also initiate random access when uplink transmission is required. A random access procedure includes the following four steps: 1) the terminal device sends a random access preamble sequence to the network device; 2) the network device sends a PDCCH scrambled with an RA-RNTI, and a PDSCH scheduled by the PDCCH (i.e., the PDSCH corresponding to the RA-RNTI) includes uplink authorization information corresponding to the random access preamble sequence sent by the terminal device, where the uplink authorization information includes uplink resource information and a TC-RNTI allocated by the network device for the terminal device; 3) the terminal device sends the uplink access information to the network device on a uplink resource; and 4) the network device sends a PDCCH scrambled with the TC-RNTI to the terminal device after receiving the uplink access information, where a PDSCH scheduled by the PDCCH (i.e., the PDSCH corresponding to the TC-RNTI) includes random access success confirmation information of the terminal device.

When at least one symbol of transmission time units of downlink data channels corresponding to downlink control channels scrambled with different RNTIs overlaps, the terminal device may decode the downlink data channels corresponding to the different RNTIs at different times. Therefore, the embodiments of the present application provides that when at least one symbol of transmission time units of downlink data channels corresponding to downlink control channels scrambled with different RNTIs overlaps in a time domain, the terminal device may determine a downlink data channel to be preferentially decoded according to the RNTIs used to scramble the downlink control channels, so that is may effectively decode the downlink data channels, thereby improving the reception performance of the downlink data channels.

It should be understood that, in the embodiments of the present application, a PDSCH corresponding to a RNTI refers to a PDSCH scheduled by a PDCCH scrambled with the RNTI, and indication information in the PDCCH may indicate a resource occupied by the PDSCH, which will not be repeated in the below for brevity.

FIG. 2 is a schematic flowchart of a downlink channel receiving method 200 according to an embodiment of the present application. The method described in FIG. 2 may be performed by a terminal device, which may be, for example, the terminal device 120 shown in FIG. 1. In an embodiment, the terminal device is a terminal device in an idle state (i.e., an RRC-idle state). As shown in FIG. 2, the downlink channel receiving method 200 may include some or all of the following steps, where:

in 210, the terminal device receives first downlink authorization information and second downlink authorization information that are sent by a network device, where the first downlink authorization information is used to indicate that the terminal device receives a first physical downlink shared channel PDSCH in a first time unit, the second downlink authorization information is used to indicate that the terminal device receives a second PDSCH in a second time unit, and at least one symbol of the first time unit and at least one symbol of the second time unit overlap in a time domain.

In 220, the terminal device determines, according to a RNTI used to scramble the first downlink authorization information and the second downlink authorization information, a PDSCH that is preferentially decoded from the first PDSCH and the second PDSCH.

The first downlink authorization information is used to indicate that the terminal device receives the first PDSCH in the first time unit, and the second authorization information is used to indicate that the terminal device receives the second PDSCH in the second time unit; when at least one symbol of the first time unit and at least one symbol of the second time unit overlap in a time domain, the terminal device may determine whether to preferentially decode the first PDSCH or the second PDSCH according to a RNTI type scrambling the first downlink authorization information and a RNTI type scrambling the second downlink authorization information. The RNTI type described herein may include, for example, an SI-RNTI, a P-RNTI, an RA-RNTI, or a TC-RNTI.

Therefore, when at least one symbol of transmission time units of downlink data channels corresponding to downlink control channels scrambled with different RNTIs overlaps in a time domain, the terminal device determines the downlink data channel to be preferentially decoded according to the RNTIs used to scramble the downlink control channels, so that it may effectively decode the downlink data channels, thereby improving the reception performance of the downlink data channels.

The downlink channel receiving method in the embodiments of the present application is described in detail below with reference to seven scenarios. Since a PDSCH corresponding to the RA-RNTI and a PDSCH corresponding to the TC-RNTI are PDSCHs in two different steps in the random access procedure, there is no overlap between their transmission time units.

Scenario 1

The first downlink authorization information is downlink authorization information scrambled with an SI-RNTI, and the second downlink authorization information is downlink authorization information scrambled with a P-RNTI.

In an embodiment, in 220, the determining, by the terminal device, a PDSCH that is preferentially decoded from the first PDSCH and the second PDSCH, includes: determining, by the terminal device, to preferentially decode the first PDSCH corresponding to the SI-RNTI in case that the terminal device determines that system information is changed; and determining, by the terminal device, to preferentially decode the second PDSCH corresponding to the P-RNTI in case that the terminal device determines that the system information is unchanged.

This is because that considering that when the terminal device considers that the system information is changed, errors may occur in a subsequent transmission if the terminal device does not update the system information in time. Therefore, when the terminal device considers that the system information is changed, the terminal device may preferentially decode the first PDSCH corresponding to the SI-RNTI, and otherwise, it may preferentially decode the second PDSCH corresponding to the P-RNTI.

In an embodiment, the method further includes: receiving, by the terminal device, third downlink authorization information that is sent by the network device, where the third downlink authorization information is the downlink authorization information scrambled with the P-RNTI; determining, by the terminal device, that the system information is changed according to the third downlink authorization information.

It should be noted that the determining, by the terminal device, that the system information is changed, refers to that the terminal device will consider that the system information is changed when it receives the third downlink authorization information scrambled with the P-RNTI sent by the network device, but the fact that whether the system information is changed will not be affected by the judgment of the terminal device. At this time, the system information is likely to be unchanged, but the terminal device considers that the system information is changed only because it receives the third authorization information, thereby determining to preferentially decode the first PDSCH corresponding to the SI-RNTI. In other words, the determining, by the terminal device, that the system information is changed, may be understood as that the terminal device receives the third authorization information scrambled with the P-RNTI sent by the network device.

Or, in an embodiment, in 220, the determining, by the terminal device, a PDSCH that is preferentially decoded from the first PDSCH and the second PDSCH, includes: determining, by the terminal device, to preferentially decode the second PDSCH corresponding to the P-RNTI.

Considering that the network device may avoid overlapping between the PDSCH corresponding to the P-RNTI and the PDSCH corresponding to the SI-RNTI of which the system information is changed by scheduling, thus in this case, the overlapping of the downlink channels is mostly caused by the fact that the network device considers that the terminal device has an urgent service and needs to access a system as soon as possible, so that a priority of a paging channel is higher, and the terminal device needs to preferentially decode the second PDSCH corresponding to the P-RNTI.

Scenario 2

The first downlink authorization information is downlink authorization information scrambled with an SI-RNTI, and the second downlink authorization information is downlink authorization information scrambled with an RA-RNTI or a TC-RNTI.

Then, in an embodiment, in 220, the determining, by the terminal device, a PDSCH that is preferentially decoded from the first PDSCH and the second PDSCH, includes: determining, by the terminal device, to preferentially decode the first PDSCH corresponding to the SI-RNTI in case that the terminal device determines that system information is changed; and determining, by the terminal device, to preferentially decode the second PDSCH corresponding to the RA-RNTI or the second PDSCH corresponding to the TC-RNTI in case that the terminal device determines that the system information is unchanged.

This is because that considering that when the terminal device considers that the system information is changed, errors may occur in a subsequent transmission if the terminal device does not update the system information in time. Therefore, when the terminal device considers that the system information is changed, the terminal device may preferentially decode the first PDSCH corresponding to the SI-RNTI, and otherwise, it may preferentially decode the second PDSCH corresponding to the RA-RNTI or the second PDSCH corresponding to TC-RNTI.

In an embodiment, the method further includes: receiving, by the terminal device, third downlink authorization information that is sent by the network device, where the third downlink authorization information is the downlink authorization information scrambled with the P-RNTI; determining, by the terminal device, that the system information is changed according to the third downlink authorization information.

Same as in Scenario 1, the determining, by the terminal device, that the system information is changed, refers to that the terminal device will consider that the system information is changed when it receives the third downlink authorization information scrambled with the P-RNTI sent by the network device, but the fact that whether the system information is changed will not be affected by the judgment of the terminal device. At this time, the system information is likely to be unchanged, but the terminal device considers that the system information is changed only because it receives the third authorization information, thereby determining to preferentially decode the first PDSCH corresponding to the SI-RNTI. In other words, the determining, by the terminal device, that the system information is changed, may be understood as that the terminal device receives the third authorization information scrambled with the P-RNTI sent by the network device.

Or, in an embodiment, in 220, the determining, by the terminal device, a PDSCH that is preferentially decoded from the first PDSCH and the second PDSCH, includes: determining, by the terminal device, to preferentially decode the second PDSCH corresponding to the RA-RNTI or the second PDSCH corresponding to the TC-RNTI.

This is because the PDSCHs corresponding to the RA-RNTI and the TC-RNTI are the downlink channels received by the terminal device in an initial access phase, and the network device may notify, in the initial access phase or after the initial access is completed, changed system information to the terminal device through an RRC signaling, so the PDSCHs corresponding to the RA-RNTI and the TC-RNTI have a higher priority.

Scenario 3

The first downlink authorization information is downlink authorization information scrambled with a P-RNTI, and the second downlink authorization information is downlink authorization information scrambled with an RA-RNTI or a TC-RNTI.

In an embodiment, in 220, the determining, by the terminal device, a PDSCH that is preferentially decoded from the first PDSCH and the second PDSCH, includes: determining, by the terminal device, to preferentially decode the second PDSCH corresponding to the RA-RNTI or the second PDSCH corresponding to the TC-RNTI.

Since the PDSCH corresponding to the P-RNTI is a paging of the network device that is sensed by the terminal device in an idle state, the network device may activate the terminal device to receive downlink data, or may not activate the terminal device to receive the downlink data, but the PDSCH corresponding to the RA-RNTI and the PDSCH corresponding to the TC-RNTI are downlink channels transmitted, spontaneously, by the terminal device during the random access process. Therefore, the terminal device may preferentially receive the PDSCH corresponding to the RA-RNTI and the PDSCH corresponding to the TC-RNTI in this case.

Or, in an embodiment, in 220, the determining, by the terminal device, a PDSCH that is preferentially decoded from the first PDSCH and the second PDSCH, includes: receiving, by the terminal device, the first PDSCH corresponding to the P-RNTI in the first time unit according to the first downlink authorization information.

Considering that the network device may avoid overlapping between the PDSCH corresponding to the P-RNTI and the PDSCH corresponding to the RA-RNTI (or TC-RNTI) by scheduling, thus in this case, the overlapping of the downlink channels is mostly caused by the fact that the network device considers that the terminal device has an urgent service and needs to access a system as soon as possible, so that a priority of a paging channel is higher, and the terminal device needs to preferentially decode the second PDSCH corresponding to the P-RNTI.

Or, in an embodiment, in 220, the determining, by the terminal device, a PDSCH that is preferentially decoded from the first PDSCH and the second PDSCH, includes: determining, by the terminal device, to preferentially decode the second PDSCH corresponding to the RA-RNTI in case that the second downlink authorization information is the downlink authorization information scrambled with the RA-RNTI; and determining, by the terminal device, to preferentially decode the first PDSCH corresponding to the P-RNTI in case that the second downlink authorization information is the downlink authorization information scrambled with the TC-RNTI.

Since the PDSCH corresponding to the RA-RNTI is not retransmitted, and the PDSCH corresponding to the TC-RNTI is retransmitted, when at least one symbol of a transmission time unit of the PDSCH corresponding to the P-RNTI and at least one symbol of a transmission time unit of the PDSCH corresponding to the RA-RNTI overlap, the terminal device may preferentially decode the PDSCH corresponding to the RA-RNTI; when at least one symbol of a transmission time unit of the PDSCH corresponding to the P-RNTI and at least one symbol of a transmission time unit of the PDSCH corresponding to the TC-RNTI overlap, the terminal device may preferentially decode the PDSCH corresponding to the P-RNTI, and the PDSCH corresponding to the TC-RNTI may be received again during next retransmission.

Scenario 4

In an embodiment, if a first symbol in the first time unit is earlier than a first symbol in the second time unit in the time domain, then in 220, the determining, by the terminal device, a PDSCH that is preferentially decoded from the first PDSCH and the second PDSCH, includes: determining, by the terminal device, to preferentially decode the first PDSCH.

That is, among the PDSCH corresponding to the SI-RNTI, the PDSCH corresponding to the P-RNTI, and the PDSCH corresponding to the RA-RNTI (or TC-RNTI), when at least one symbol of transmission time units of any two of the above PDSCHs overlaps, the terminal device preferentially decodes a PDSCH whose start symbol is earlier between the two overlapping PDSCHs.

In this way, the network device may begin to decode the overlapping downlink channels as early as possible, thereby leaving more processing time for decoding the second downlink channel.

Scenario 5

In an embodiment, if a first symbol in the first time unit is earlier than a first symbol in the second time unit in the time domain, then in 220, the determining, by the terminal device, a PDSCH that is preferentially decoded from the first PDSCH and the second PDSCH, includes: receiving, by the terminal device, the second PDSCH in the second time unit according to the second downlink authorization information.

Considering that the network device may avoid overlapping of the downlink channels by scheduling, thus in this case, the overlapping of the downlink channels is mostly caused by the fact that the network device considers that the following downlink channel service is urgent and needs to be processed by the terminal as soon as possible.

Scenario 6

Among the PDSCH corresponding to the SI-RNTI, the PDSCH corresponding to the P-RNTI, and the PDSCH corresponding to the RA-RNTI (or TC-RNTI), when at least one symbol of transmission time units of every two of the above three PDSCHs overlaps, the terminal device may determine a channel that is required to be preferentially decoded from the two different PDSCHs at a time, and finally obtain a decoding order of the three PDSCHs.

For example, it is assumed that when at least one symbol in the transmission time unit of the PDSCH corresponding to the SI-RNTI and at least one symbol in the transmission time unit of the PDSCH corresponding to the P-RNTI overlap, the PDSCH corresponding to the P-RNTI is preferentially decoded; when the at least one symbol in the transmission time unit of the PDSCH corresponding to the SI-RNTI and at least one symbol in the transmission time unit of the PDSCH corresponding to the RA-RNTI (or TC-RNTI) overlap, the PDSCH corresponding to the RA-RNTI (or TC-RNTI) is preferentially decoded; when the at least one symbol in the transmission time unit of the PDSCH corresponding to the P-RNTI and at least one symbol in the transmission time unit of the PDSCH corresponding to the RA-RNTI (or TC-RNTI) overlap, the PDSCH corresponding to the RA-RNTI (or TC-RNTI) is preferentially decoded.

Therefore, the terminal device may determine that the decoding order is successively: the second PDSCH corresponding to the RA-RNTI (or TC-RNTI), the PDSCH corresponding to the P-RNTI, and the PDSCH corresponding to the SI-RNTI.

Scenario 7

When at least one symbol in the transmission time units of the downlink data channels corresponding to the downlink control channels scrambled with different RNTI overlaps in the time domain, the terminal device may determine, by itself, to preferentially decoding one PDSCH from the first PDSCH and the second PDSCH.

It should be noted that, in the case of no collision, each embodiment and/or the technical features in the each embodiment described in the present application may be combined with each other arbitrarily, and the combined technical solutions shall also fall within the protection scope of the present application.

It should be understood that in each embodiment of the present application, the sequence numbers of the above processes do not imply a sequence of executions, and the execution order of the processes should be determined by their functions and an internal logic, and should not constitute any limitation on the implementation process of the embodiments of the present application.

The downlink channel receiving method according to the embodiment of the present application is described in detail above. Hereinafter, an apparatus according to the embodiments of the present application will be described with reference to FIG. 3 to FIG. 5, and the technical features described in the method embodiment are applicable to the following apparatus embodiment.

FIG. 3 is a schematic block diagram of a terminal device 300 according to an embodiment of the present application. As shown in FIG. 3, the terminal device 300 includes a transceiver unit 310 and a determining unit 320.

The transceiver unit 310 is configured to receive first downlink authorization information and second downlink authorization information that are sent by a network device, where the first downlink authorization information is used to indicate that the terminal device receives a first physical downlink shared channel PDSCH in a first time unit, the second downlink authorization information is used to indicate that the terminal device receives a second PDSCH in a second time unit, and at least one symbol of the first time unit and at least one symbol of the second time unit overlap in a time domain; and the determining unit 320 is configured to determine, according to a radio network temporary identifier RNTI used to scramble the first downlink authorization information and the second downlink authorization information received by the transceiver unit, a PDSCH that is preferentially decoded from the first PDSCH and the second PDSCH.

Therefore, when at least one symbol of transmission time units of downlink data channels corresponding to downlink control channels scrambled with different RNTIs overlaps in a time domain, the terminal device determines the downlink data channel to be preferentially decoded according to the RNTIs used to scramble the downlink control channels, so that it may effectively decode the downlink data channels, thereby improving the reception performance of the downlink data channels.

In an embodiment, the first downlink authorization information is downlink authorization information scrambled with an SI-RNTI, and the second downlink authorization information is downlink information scrambled with a P-RNTI; the determining unit 320 is configured to: determine to preferentially decode the first PDSCH corresponding to the SI-RNTI in case that the system information is determined to be changed; and determine to preferentially decode the second PDSCH corresponding to the P-RNTI in case that the system information is determined to be unchanged.

In an embodiment, the first downlink authorization information is downlink authorization information scrambled with an SI-RNTI, and the second downlink authorization information is downlink authorization information scrambled with an RA-RNTI or a temporary cell-radio network temporary identifier TC-RNTI; the determining unit 320 is configured to: determine to preferentially decode the first PDSCH corresponding to the SI-RNTI in case that the system information is determined to be changed; and determine to preferentially decode the second PDSCH corresponding to the RA-RNTI or the second PDSCH corresponding to the TC-RNTI in case that the system information is determined to be unchanged.

In an embodiment, the transceiver unit 310 is further configured to: receive third downlink authorization information that is sent by the network device, where the third downlink authorization information is the downlink authorization information scrambled with the P-RNTI; the determining unit 320 is further configured to: determine that the system information is changed according to the third downlink authorization information.

In an embodiment, the first downlink authorization information is downlink authorization information scrambled with a P-RNTI, and the second downlink authorization information is downlink authorization information scrambled with an RA-RNTI or a TC-RNTI; the determining unit 320 is configured to: determine to preferentially decode the second PDSCH corresponding to the RA-RNTI or the second PDSCH corresponding to the TC-RNTI.

In an embodiment, the first downlink authorization information is downlink authorization information scrambled with a P-RNTI, and the second downlink authorization information is downlink authorization information scrambled with an RA-RNTI or a TC-RNTI; the determining unit 320 is configured to: determine, by the terminal device, to preferentially decode the second PDSCH corresponding to the RA-RNTI in case that the second downlink authorization information is the downlink authorization information scrambled with the RA-RNTI; and determine, by the terminal device, to preferentially decode the first PDSCH corresponding to the P-RNTI in case that the second downlink authorization information is the downlink authorization information scrambled with the TC-RNTI.

In an embodiment, a first symbol in the first time unit is earlier than a first symbol in the second time unit in the time domain, and the determining unit 320 is configured to: determine to preferentially decode the first PDSCH.

In an embodiment, the terminal device is a terminal device in an idle state.

It should be understood that the communication device 300 may perform the corresponding operations performed by the terminal device in the foregoing method 200, which will not be repeated herein for brevity.

FIG. 4 is a schematic structural diagram of a terminal device 400 according to an embodiment of the present application. As shown in FIG. 4, the terminal device includes a processor 410 that may call and run a computer program from a memory to implement a corresponding process implemented by the terminal device in each method according to the embodiments of the present application, which will not be repeated herein for brevity.

In an embodiment, as shown in FIG. 4, the communication device 400 may further include a memory 420. The processor 410 may call and run a computer program from the memory 420 to implement the method according to the embodiments of the present application.

The memory 420 may be a separate device independent of the processor 410 or may be integrated in the processor 410.

In an embodiment, as shown in FIG. 4, the communication device 400 may further include a transceiver 430, and the processor 410 may control the transceiver 430 to communicate with other devices, in particular, may send information or data to other devices, or may receive information or data sent by other devices.

The transceiver 430 may include a transmitter and a receiver. The transceiver 430 may further include an antenna, and the number of the antennas may be one or more.

Figure 5:
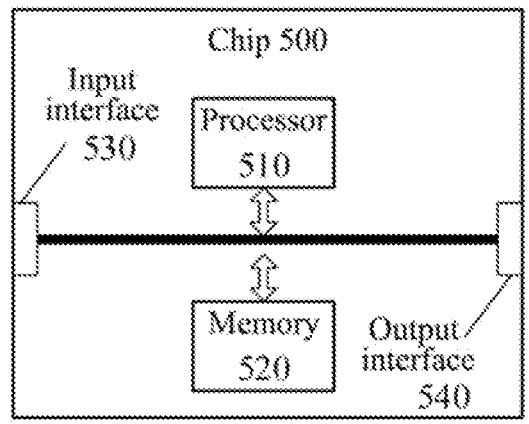
FIG. 5 is a schematic structural diagram of a chip according to an embodiment of the present application.

FIG. 5 is a schematic structural diagram of a chip according to an embodiment of the present application. The chip 500 shown in FIG. 5 includes a processor 510 that may call and run a computer program from a memory to implement the method according to the embodiments of the present application.

The memory 520 may be a separate device independent of the processor 510 or may be integrated in the processor 510.

In an embodiment, the chip 500 may also include an input interface 530. The processor 510 may control the input interface 530 to communicate with other devices or chips. The processor 510 may obtain information or data sent by other devices or chips.

In an embodiment, the chip 500 may also include an output interface 540. The processor 510 may control the output interface 540 to communicate with other devices or chips. The processor 510 may output information or data to other devices or chips.

In an embodiment, the chip may be applied to the terminal device according to the embodiments of the present application, and the chip may implement a corresponding process implemented by the terminal device in each method according to the embodiments of the present application, which will not be repeated herein for brevity.

It should be understood that the chip mentioned in the embodiments of the present application may also be referred to as a system level chip, a system chip, a chip system or a system on chip.

The processor described above may be a general purpose processor, a digital signal processor (DSP), a field programmable gate array (FPGA), an application specific integrated circuit (ASIC) or other programmable logic devices, transistor logic devices, discrete hardware components, or the like. The general purpose processor described above may be a microprocessor or may be any conventional processor or the like.

The memory described above may be a volatile memory or a non-volatile memory, or may include both the volatile memory and the non-volatile memory. The non-volatile memory may be a read-only memory (ROM), a programmable ROM (ROMM), an erasable PROM (erasable PROM, EPROM), or an electrically EPROM (EEPROM), or a flash memory. The volatile memory may be a random access memory (RAM).

It should be understood that the foregoing memory is exemplary but not limited. For example, the memory in the embodiments of the present application may also be a static RAM (SRAM), a dynamic RAM (DRAM), or a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, the memory in the embodiments of the present application is intended to include, but is not limited to, these and any other suitable types of memory.

It should be understood that in the embodiments of the present disclosure, "B corresponding to A" indicates that B is associated with A, and B may be determined according to A. However, it should also be understood that determining B according to A does not mean that B is only determined according to A, but that B may also be determined based on A and/or other information.

Those of ordinary skill in the art will appreciate that units and algorithm steps of each example described with reference to the embodiments disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the scope of the present application.

A person skilled in the art may clearly understand that for convenience and brevity of the description, the specific working process of the system, the apparatus and the unit described above may refer to corresponding processes in the foregoing method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation. For example, multiple units or components may be combined or be integrated into another system, or some features may be ignored or not executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs to implement the purpose of the solution of the present embodiment.

In addition, each functional unit in the embodiments of the present application may be integrated into one processing unit, or each unit may physically exist independently, or two or more of the above units may be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes several instructions for enabling a computer device (which may be a personal computer, a server, or a network device, or the like) to perform all or part of the steps described in methods in the embodiments of the present application. The above storage medium includes various media that may store program codes, such as a U disk, a mobile hard disk, a read-only memory (ROM), a random access memory (RAM), a magnetic disk, or an optical disk.

The above is only specific implementation forms of the present application, the protection scope of the present application is not limited thereto, and modifications or substitutions that may easily be derived by those skilled in the art within the technical scope disclosed in the present application should be covered within the protection scope of the present application. Therefore, the protection scope of the present application should be subject to the protection scope of the claims.

What is claimed is:

1. A downlink channel receiving method, comprising:
receiving, by a terminal device, first downlink control channel and second downlink control channel that are sent by a network device, wherein the first downlink control channel is used to indicate that the terminal device receives a first physical downlink shared channel (PDSCH) in a first time unit, the second downlink control channel is used to indicate that the terminal device receives a second PDSCH in a second time unit; and
decoding, by the terminal device, the first PDSCH and the second PDSCH according to a radio network temporary identifier (RNTI) used to scramble the first downlink control channel and an RNTI used to scramble the second downlink control channel, wherein the RNTI used to scramble the first downlink control channel is a SI-RNTI, and the RNTI used to scramble the second downlink control channel is a random access RNTI (RA-RNTI) or a temporary cell RNTI (TC-RNTI),
wherein the first PDSCH and the second PDSCH partially or fully overlap in time.

2. A terminal device, comprising: a transceiver, a memory, a processor, and a computer program stored on the memory and operable on the processor,
wherein in case that the processor runs the computer program, the processor is configured to:
control the transceiver to receive first downlink control channel and second downlink control channel that are sent by a network device, wherein the first downlink control channel is used to indicate that the terminal device receives a first physical downlink shared channel (PDSCH) in a first time unit, the second downlink control channel is used to indicate that the terminal device receives a second PDSCH in a second time unit; and
decode the first PDSCH and the second PDSCH according to a radio network temporary identifier (RNTI) used to scramble the first downlink control channel and an RNTI used to scramble the second downlink control channel, wherein the RNTI used to scramble the first downlink control channel is a SI-RNTI and the RNTI used to scramble the second downlink control channel is a random access RNTI (RA-RNTI) or a temporary cell RNTI (TC-RNTI), wherein the first PDSCH and the second PDSCH partially or fully overlap in time.

* * * * *